Feb. 11, 1969

K. F. PLITT ET AL 3,427,205

SPACECRAFT BATTERY SEALS

Filed Sept. 1, 1966

INVENTORS
Karl F. Plitt &
Carroll H. Clatterbuck

BY *McCoy*
*Earl Levy*

ATTORNEYS

# United States Patent Office 3,427,205
Patented Feb. 11, 1969

3,427,205
SPACECRAFT BATTERY SEALS
Karl F. Plitt, Kensington, and Carroll H. Clatterbuck, Silver Spring, Md., assignors to the United States of America as represented by the Administrator of the National Aeronautics and Space Administration
Filed Sept. 1, 1966, Ser. No. 577,114
U.S. Cl. 136—133                8 Claims
Int. Cl. H01m 1/02

ABSTRACT OF THE DISCLOSURE

A battery seal is used to insulate a terminal of an inverted T-shape. The terminal extends through a flat cover plate of the battery and is insulated from the plate by the seal having a rubberized characteristic. The insulation comprises two parallel washers above and below the plate joined by a hollow conical section that protrudes through the plate. The terminal leg fits inside this section with insulation extending around the periphery of the cross member by the bottom washer, and means are provided to create a pressure seal between the insulation and the plate. The terminal is thereby insulated from the casing and internally forming dendrites.

---

The invention described herein was made by employees of the United States Government and may be manufactured and used by or for the Government for governmental purposes without the payment of any royalties thereon or therefor.

The invention relates to batteries and more particularly to batteries having pressure tight seals around insulated terminals.

Batteries generally comprise a closed metal container having a plurality of pairs of dissimilar metal plates mounted therein. When a suitable electrolyte is added to the container an electric potential difference exists across the plates. Normally, one set of plates is connected to the metal container and the second set of plates is connected to a terminal that extends through the container's wall. The terminal is suitably insulated from the metal container. Hence a potential difference exists between the terminal and the container.

While batteries of the foregoing nature have found widespread use their operation under various environmental conditions has not always been entirely satisfactory. Specifically, when a battery of the foregoing nature is used in an earth-orbiting or other space vehicle it has been found to leak at the insulation surrounding the terminal. This leaking is normally due to dissimilar pressure conditions existing between the interior and the exterior of the battery, the gas pressure inside of the battery container being greater than the pressure on the outside of the container. Further, when a battery in a space vehicle is charged and discharged its internal gas pressure goes up and down. Hence, batteries suitable for use in space are subject to varying pressure conditions.

It will be appreciated by those skilled in the art and others that while the hereinafter description of the invention is directed to a space battery the invention is also suitable for use with batteries in general. That is, the invention is a battery having an insulating pressure seal that is suitable for use in space; however, the battery may also be used on earth.

The prior art has attempted to solve the battery leakage problem in several ways. One such prior art approach has been to find suitable adhesives for use between the terminal and its surrounding insulation and for use between the insulation and its surrounding container. While some of these attempts have improved the pressure resistance of battery seals they have not been entirely successful. Specifically, the search for insulation to metal adhesives has not revealed an adhesive that will withstand the varying pressure changes that occur when a battery is used in a space vehicle over an extended period of time.

In addition to batteries leaking it has been found that space batteries, particularly those with alkaline electrolytes, are subject to the internal formation of dendrites. These dendrites have formed across the terminals (the insulated terminal and the container) resulting in the internal shorting of the battery. Moreover, it has been found that the insulating seals utilized with prior art batteries have also been subject to deterioration when used with alkaline electrolytes.

Therefore, it is an object of this invention to provide a new and improved battery.

It is also an object of this invention to provide a new and improved battery having an insulated seal that prevents battery leakage under varying pressure conditions and that prevents battery shorting due to dendrite formation.

It is a further object of this invention to provide a new and improved battery seal.

It is still a further object of this invention to provide a new and improved battery terminal seal that prevents battery leakage under varying pressure conditions and that prevents battery shorting due to dendrite formation.

It has also been found that prior art batteries with an adhesive type seal are expensive to make. Specifically, a battery of that nature is produced by expensive molds and molding processes. Further, adhesive seal batteries are normally potted to give extra sealing; potting adds battery weight making potted batteries objectionable for space use.

Hence, it is a still further object of this invention to provide a new and improved battery having a seal that is cheap and inexpensive to manufacture and is light in weight.

In accordance with a principle of the invention a new and improved battery is provided which includes an open-ended metal container containing a plurality of battery plates. A metal cover for enclosing the open end of the container is provided. The cover may be welded to the metal container to provide a tight seal between the container and the cover. Mounted through the metal cover but insulated therefrom is a terminal having a cross section in the form of an inverted T. A first insulating member is mounted between the T's cross member and the cover and between the T's leg and the cover. A second insulating member is mounted about the leg on the side of the cover opposite from the first insulating member. A metal washer is mounted over the second insulating member. Pressure means is provided to force the washer toward the T's cross member. This force creates pressure on the insulating members to provide a pressure tight seal.

In accordance with a further principle of the invention the first insulating member includes a lip. The lip extends around the T's cross member and is adapted to prevent dendrite formation.

Because it may be desirable to fill the battery with electrolyte after the cover is attached to the container the invention also provides a fill tube in the cover. This fill tube is closed by any suitable means after the electrolyte is inserted.

It will be appreciated that the invention provides a very simple seal. Mechanical strength instead of an adhesive provides a pressure tight seal. This mechanical strength has numerous advantages over the prior art. It is highly resistant to pressure leaks. Further, no additional potting or sealing is needed. Moreover, the lip prevents battery shorting dendrite formation. In addition, the seal lends itself to low-cost production. Finally, the seal is light weight.

The foregoing and other objects of this invention will become more readily appreciated as the same becomes better understood by reference to the following detailed description when taken in conjunction with the accompanying drawings wherein.

Figure 1:
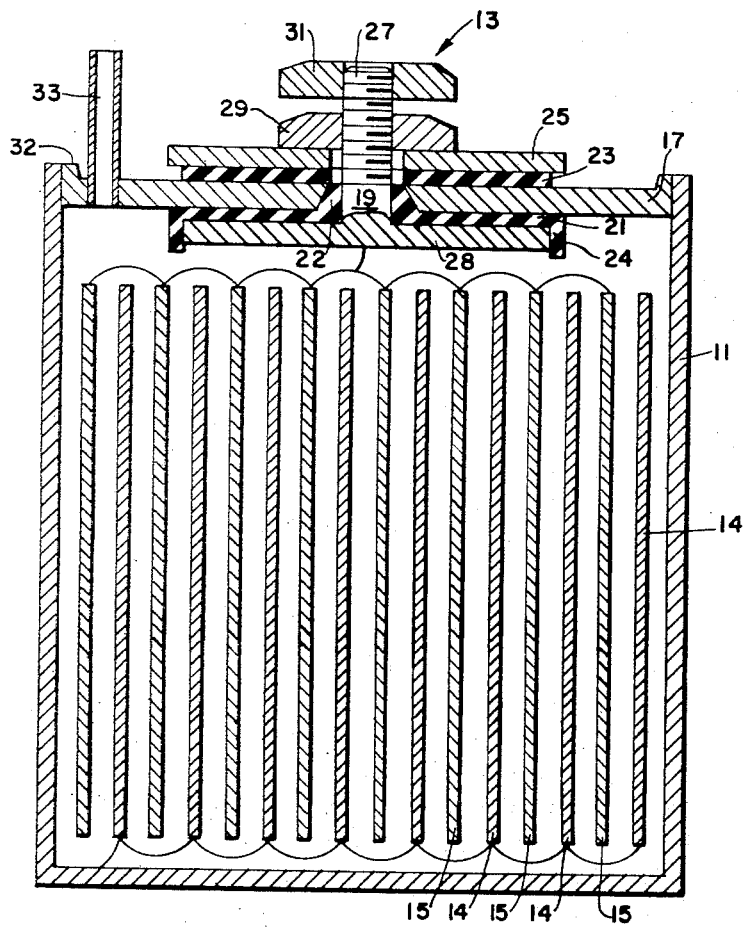
FIG. 1 illustrates one embodiment of the invention.

Turning now to the drawings wherein like reference numerals designate like parts throughout the several views, FIG. 1 illustrates a battery made in accordance with the invention. The battery illustrated in FIG. 1 comprises an open-ended container 11, preferably made of metal, and a cover member generally indicated at 13. Mounted in the container 11 are a first plurality of plates 14 formed of one metal and a second plurality of plates 15 formed of a dissimilar metal. In a conventional manner similar plates are connected together. The plates are preferably alternately, parallel aligned. Alternatively, the battery plates could be two in number and formed in rings; generally, any conventional battery plate configuration can be used.

The cover member 13 comprises a metal cover plate 17, a terminal 19, a molded insulating washer 21, a flat insulating washer 23, a metal washer 25, a first nut 29, and a second nut 31. The terminal 19 has an inverted T-shaped cross section. The leg 27 of the terminal 19 is threaded and the cross member 28 of the terminal is preferably large and flat. Hence, the terminal illustrated in FIG. 1 is in the general shape of an inverted bolt having a large flat head. The molded washer 21 has an aperture through which the leg 27 fits. A conical projection 22 from the molded washer fits about the leg 27 and extends upwardly for a short distance from the upper surface of the washer as viewed in FIG. 1. Hence, the molded insulating washer 21 fits snugly about a portion of the surface of the juncture forming the T. Moreover, a lip 24 of the molded insulating washer fits about the edge of the large, flat cross member of the terminal.

The cover 17 has a circular hole through which the bolt and the conical projection 22 of the molded washer fit. The inner side of the hole of the cover plate 17 is larger than the outer side. The conical projection fits through the cover hole in such a manner as to fill the space between the leg 27 and the edge of the hole when the upper face of the molded insulating washer is against the lower face of the cover 17.

Mounted on the other side of the cover plate from the molded washer is the flat insulating washer 23. When mounted, one face of the flat insulating washer presses against the upper face of the cover plate. Mounted on the other side of the flat insulating washer 23 is the flat metal washer 25. A first nut 29 is screwed onto a threaded leg of the terminal 19 and contacts the other face of the flat metal washer 25. Preferably, the flat insulating washer 23 and the flat metal washer 25 each have a circular hole therein that is slightly larger than the leg 27 of the terminal. This larger size provides an expansion space for the upper conical portion of the conical projection when the first nut 29 is tightened to force the metal washer toward the cross member of the terminal. Further, the larger size allows the conical projection to align the flat insulating washer and the metal washer. That is, these washers will fit over the conical projection when pressure is applied and be aligned therewith. Hence, when the bolt is tightened by turning the nut in a conventional manner the metal washer 25, the flat insulating washer 23, the cover plate 17, and the molded insulating washer 21 are pressed between the first nut 29 and the cross member 28 of the terminal 19. In this manner a mechanical means is provided for creating an insulated pressure tight seal.

The cover plate 17 is insulated from the leg 27 of the terminal 19 by the conical projection of the molded insulating washer 21. The flat portion of the molded insulating washer 21 insulates the cover 17 from the cross member of the terminal 19, and the flat insulating washer 23 insulates the metal washer 25 from the cover 17. A second nut 31 may be provided so that a terminal contact member may be inserted between the first and second nuts to provide a pressing electrical connection between the contact and the leg.

The cover 17 is adapted to be welded to the container 11. To aid in this welding a lip 32 extends upwardly around the periphery of the cover 17 as viewed in FIG. 1. Welding provides a pressure tight seal between the cover 17 and the container 11. However, welding is not essential. Generally, any suitable method of providing adherence between the metal cover and the container 11 which will form a pressure tight seal is satisfactory.

It will be appreciated that the foregoing description has described a battery which is suitable for use under varying pressure changing environmental conditions. A pressure seal is provided between the battery terminal and its interior. Further, a simple weld provides a pressure seal between the battery cover and the battery container. By connecting the container to one set of dissimilar plates and connecting the terminal 19 to the other set of dissimilar plates a potential is created between the terminal and the container when a suitable electrolyte is inserted into the battery. The electrolyte can be inserted prior to welding the cover to the container or a fill tube of the type illustrated in FIG. 1 can be used. The fill tube illustrated in FIG. 1 comprises a metal tubular structure 33. The fill tube is inserted through a second hole formed in the cover 17. Preferably, the tube is welded to the cover. After the electrolyte is inserted into the battery the tube can then be welded closed. It will be appreciated that the fill tube allows the cover to be welded to the container when the battery is dry. This assures better welds in a production situation than would result if the electrolyte were inserted prior to welding the cover to the container.

Figure 2:
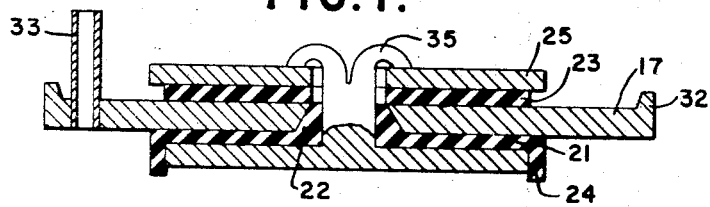
FIG. 2 illustrates a cover that can be substituted for the cover illustrated in FIG. 1 to form an alternate embodiment of the invention.

FIG. 2 illustrates an alternative embodiment of the cover structure 13. The cover illustrated in FIG. 2 is identical to that illustrated in FIG. 1 except that it utilizes a rivet 35 instead of the threaded terminal 19. By inserting the molded insulating washer member through the cover and inserting the flat washer 23 and the metal washer 25 over the stud of the rivet 35 and then peening the rivet in an appropriate manner a mechanical seal similar to that illustrated in FIG. 1 is created.

It has been found that a clamping torque of 3 inch-pounds to 10 inch-pounds produces an effective seal that can withstand positive or negative pressures up to 1000 pounds per square inch. Batteries formed with seals of the type illustrated in FIGS. 1 and 2 have been cyclically pressure tested for a year at such pressures without failure.

It will be appreciated that while the invention does not require the use of adhesives in some instances it may be desirable to use adhesives. For example, an adhesive may be utilized to maintain the first nut 29 in its desired position after it has been tightened. However, adhesives must be chosen carefully. It has been found that polyurethane and epoxy-urethane adhesives are suitable when the metal forming the container is stainless steel and the insulating material forming the insulating washers is neoprene.

Preferably, the container 11 is cylindrical in cross-section and the cover 17 is circular. However, it will be appreciated that the invention is not limited to those configurations. Moreover, the invention is not limited to the specific structure herein described. That is, the invention has been illustrated as providing a single sealed battery terminal. However, dual terminals or a plurality of terminals connected to the interior of a battery could also be constructed in accordance with the invention. Further, the invention is described as a battery seal; however, the seal could be utilized in other environments. For example, in some instances it may be desirable to have an electrical circuit in a pressure tight container. Sealed terminals made in accordance with the invention could be utilized to provide electrical connuections to the interior of said container. Hence, the invention may be practiced otherwise than as specifically illustrated herein.

What is claimed is:
1. A sealed terminal comprising:
    a flat metal member having a hole extending through said member from one flat face to a parallel opposing flat face, said hole having a larger periphery on one flat face than on the other flat face;
    a terminal having a T cross section to form a leg and a cross member;
    a first insulation means for covering the inner section of the cross member of said terminal having a conical projection about the leg of said terminal that extends a predetermined distance up the leg of said terminal, said conical section small enough to fit into the hole of said flat metal member, and having a lip extending over and around the edge of the cross member of said terminal;
    said terminal and said first insulation means coupled to said flat metal member so that the leg of said terminal extends through said flat metal member but is insulated therefrom;
    second insulation means mounted about the leg of said terminal on the opposite side of said flat metal member from said first insulation means; and
    means for creating pressure seal between said terminal and said flat metal member.
2. Apparatus as claimed in claim 1 wherein said terminal has a threaded stud portion and said means for creating a pressure seal is a washer and nut mounted on said threaded stud.
3. Apparatus as claimed in claim 1 wherein said terminal means is a rivet and said means for creating a pressure seal is a peened end of said rivet.
4. Apparatus as claimed in claim 1 wherein said first and second insulation means are neoprene insulating washers.
5. A sealed battery comprising:
    an open ended container;
    battery means mounted in said container for generating electrical energy;
    a flat metal member having a hole extending through said member from one flat face to a parallel opposing flat face, said hole having a larger periphery on one flat face than on the other flat face;
    a terminal having a T cross section to form a leg and a cross member;
    a first insulation means for covering the inner section of the cross member of said terminal having a conical projection about the leg of said terminal that extends a predetermined distance up the leg of said terminal, said conical section small enough to fit into the hole of said flat metal member, and having a lip extending over and around the edge of the cross member of said terminal;
    said terminal and said first insulation means coupled to said flat metal member so that the leg of said terminal extends through said flat metal member but is insulated therefrom;
    second insulation means mounted about the leg of said terminal on the opposite side of said flat metal member from said first insulation means;
    means for creating a pressure seal between said terminal and said flat metal member;
    said flat metal member mounted in the open end of said open ended container and fixedly attached to said open ended container to form a pressure tight seal therewith; and
    said terminal and said container connected to said battery means so that an electric potential exists between said terminal and said container.
6. Apparatus as claimed in claim 5 wherein said terminal has a threaded stud portion and said means for creating a pressure seal is a washer and nut mounted on said threaded stud portion.
7. Apparatus as claimed in claim 6 wherein said first and second insulation means are neoprene insulating washers.
8. Apparatus as claimed in claim 5 wherein said terminal means is a rivet and said means for creating a pressure seal is a peened end of said rivet.

References Cited

UNITED STATES PATENTS

| | | | |
|---|---|---|---|
| 342,594 | 5/1886 | Gibson | 136—168.3 XR |
| 945,186 | 1/1910 | Morrison | 136—163.5 XR |
| 2,934,584 | 4/1960 | Warren et al. | 136—133 |
| 3,031,517 | 4/1962 | Peters | 136—133 XR |
| 3,340,099 | 9/1967 | Sherfey | 136—133 |

WINSTON A. DOUGLAS, *Primary Examiner.*

DONALD L. WALTON, *Assistant Examiner.*

U.S. Cl. X.R.

136—168